March 19, 1935.  W. C. HEATH  1,994,646
CONVEYER SYSTEM
Filed Jan. 3, 1933
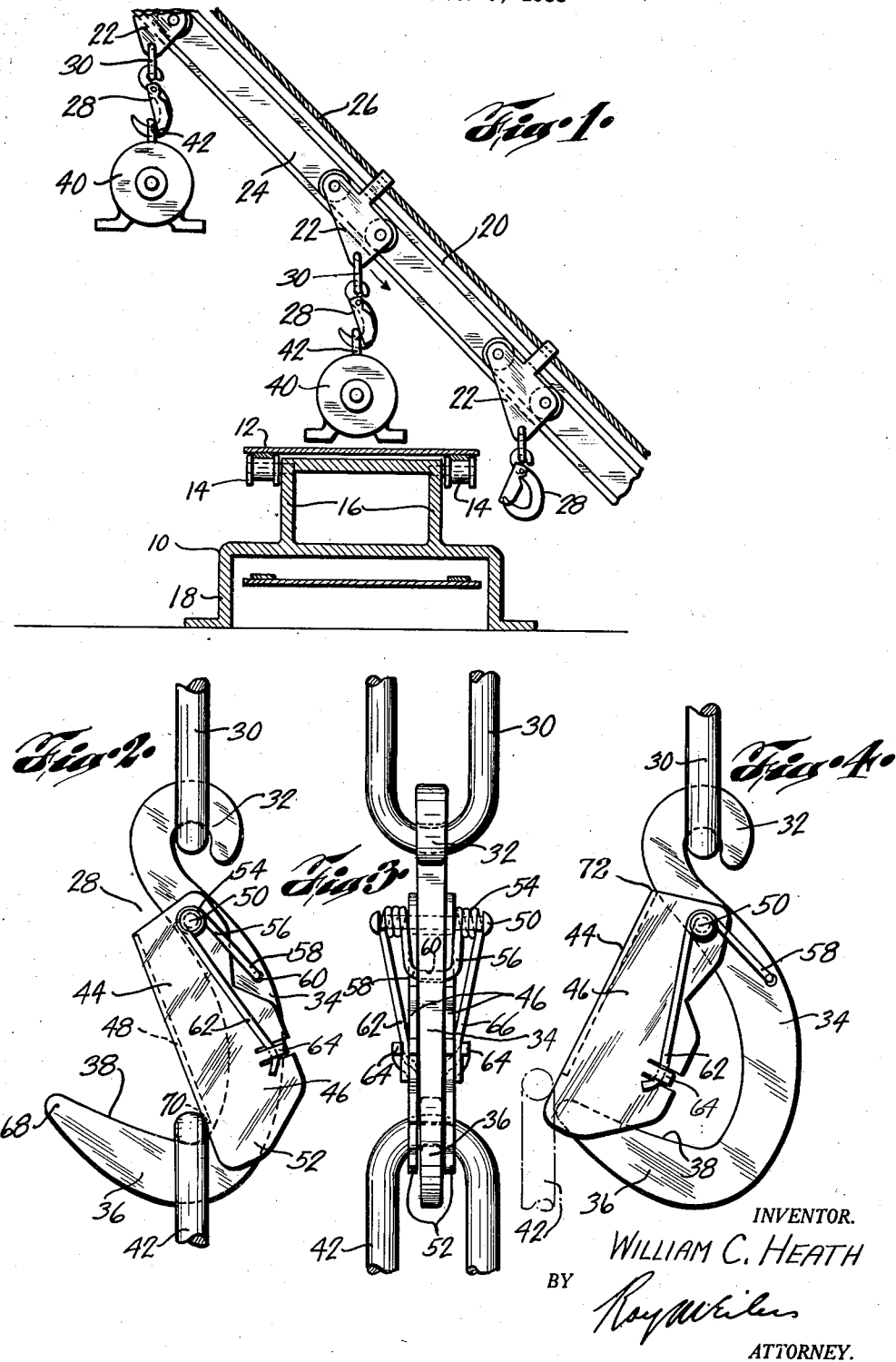
INVENTOR.
WILLIAM C. HEATH
BY
Roy M Wiler
ATTORNEY.

Patented Mar. 19, 1935

1,994,646

UNITED STATES PATENT OFFICE 1,994,646

CONVEYER SYSTEM

William C. Heath, Milwaukee, Wis., assignor to Fairbanks, Morse & Co., Chicago, Ill., a corporation of Illinois Application January 3, 1933, Serial No. 649,915

4 Claims. (Cl. 198—177)

This invention relates to improvements in conveyer systems, and more particularly to an improved carrier means, in combination with a plurality of conveyer lines or trains, whereby an article or articles to be transported thereby, may be automatically transferred from one conveyer train, to another train or line of the system.

An object of this invention, therefore, is attained in an improved article-carrying device to be employed on a conveyer train, which is adapted and arranged to release an article carried thereby, as the article is brought into engagement with an adjacent conveyer train, the releasing action of said carrying device being entirely automatic, as will more fully appear hereinafter.

A further object is to provide an article-conveying device which is of a simple and rugged construction, and which is certain in its releasing action, the automatic release being preferably attained by a spring-biased member.

Further objects and advantages will appear from the following specification, and from the accompanying drawing in which:

Fig. 1 is an assembly view, partly in section, of a conveyer system containing improvements according to the present invention; Fig. 2 is an enlarged side elevation of the improved article carrying device, showing one condition of its operation; Fig. 3 is an end elevation of the device shown in Fig. 2, and Fig. 4 is a side elevation of the same device, shown in its article releasing position.

Referring now to the drawing by numerals of reference, 10 designates, generally, a preferred form of horizontal conveyer, which may be of flight, apron or table type, or of any suitable design characterized by travelling load-receiving platform elements. The platform 12 of the conveyer is shown as carried by a series of rollers 14, disposed in spaced relation along each side portion 16 of the conveyer frame 18. The conveyer 10 is preferably power driven by any usual or suitable means, (not shown). The numeral 20 indicates, generally, an inclined conveyer composed of a train of roller-mounted carriage units or trolleys 22, which are arranged to operate along and between guide rails 24; while the trolley track may consist of a plurality of rails, only one of such rails is shown in the drawing. The roller members are connected, in spaced relation to, and actuated by a cable 26, adapted to be driven by any suitable conveyer cable drive means (not shown). Suspended from the under side of each of the carriage or trolley units 22, is a load engaging device 28, the connection thereof to the trolley carriage being made flexible, preferably by one or more chain links 30 disposed between the carriage and an eye portion 32 of the hook portion of the load-engaging member. It will be seen that, in Fig. 1, the inclined conveyer 20 is disposed above the conveyer 10, so that the direction of travel of the carriage units 22 is at substantially a right angle to the direction of travel of the adjacent portion of the conveyer platform 12. It is to be understood, of course, that the conveyers 10 and 20 may be disposed in any other relation desired, or as may be required, and that the arrangement of the conveyers in the present example is selected principally to facilitate description of an operating embodiment.

The load-engaging device of the trolley conveyer, and which is generally denoted by the numeral 28, is composed of a curved body 34, formed from a suitable metal, having at one end an eye portion 32, and at the opposite end a hook or carrier portion 36. The carrier portion is provided with a substantially flat surface 38 for engaging an article, such as, for example, an electric machine 40 having an eye bolt 42 through which the hook or carrier 36 may extend. An article releasing, or kick off member 44, preferably formed from a single blank of sheet steel, is shaped as a channel member having side portions 46 and a cross member 48, resulting in a substantially U shaped cross section. The release member is preferably pivoted at one end to the body 34, near the eye portion 32, by a pin 50 through the side portions 46 and body 34, the body being positioned between the side portions 46, with the cross member 48 on the hook side thereof, as best appears in Figs. 2 and 3. A portion of the cross member 48 is cut away or relieved near the lower end 52 of the release member, so that the member will clear the carrier portion 36 as it is pivoted about the pin 50. The pin 50 is extended beyond the side portions 46, on each side of the release member, to provide a seat for coiled sections 54 of a spring 56. The spring section 58 bridging the coiled sections is extended through and finds an anchorage in an aperture 60 in a portion of the body 34. The outer end 62 of one coil section is secured to one side portion 46 of the member 44, by an upstruck lug 64, and adjacent the lower end 52 thereof. In like manner the end 66 of the remaining coiled spring section is secured to the other adjacent side portion of the member 44. The spring coils are each wound in a manner such that both spring ends 62 and 66 will tend to bias the kick-off or release member 44 toward the tip 68 of the hook portion 36, for a purpose which will presently appear. The lower edge 70 of the cross member 48 limits the movement of the release member toward the body 34 by abutting the shank portion of the body, as is evident from Fig. 2. The outward movement of the release member, under the action of the spring 56, is arrested by the upper edge 72 engaging the body near the eye portion 32. A V-notch, is formed in a portion of each of the side members 46, adjacent the spring section 58 through the aperture 60, so that the release member will clear that portion of the spring, when the member is actuated to its innermost position as shown in Fig. 2.

In the operation of the device, any article, such as the electric machine 40 of the present example, is placed with its eye, hook or bail 42 over the carrier hook portion 36, incident to such engagement, the kick-off member 44 being carried to its innermost position, as in Fig. 2. While the article is in transit, the member 44 is maintained in this position, partly due to the slope of hook 36, and due also to the frictional engagement of the bail on the carrier, because of the weight of the article carried thereby. The spring is not of sufficient loading either to counteract the friction between parts 36 and 42, or to actuate the weighted bail 42 against the slope of portion 38. As the machine 40, attached to one of the hooks, is moved by the conveyer 20 so that it engages the platform or surface 12 of the conveyer 10, the hook and trolley are relieved of the weight of the machine, allowing the spring 56 to actuate the kick-off member 44 to its outermost position, as shown in Fig. 4, thus automatically disengaging the bail or eye 42 from the surface 38 of the trolley hook. It will be seen that, as soon as the eye 42 is relieved of its load, it is subjected to a camming action by the edges of the free ends 52 of the kick-off member. Thus each machine transported by the conveyer 20 is automatically released therefrom, as it engages the platform of the conveyer 10, the release member remaining in the position shown in Fig. 4 until another article or machine is placed on the carriage 28.

The particular advantage of the presently disclosed carriage and releasing device, is that it presents an extremely simple and durable agency for the purpose described, and one in which the releasing action is entirely automatic, eliminating any need for an operator at the point of transfer from one conveyer to another. The device is composed of but few parts, which may be readily and easily manufactured and assembled, and thereafter require little or no attention in service. It will appear that the presently described apparatus is adapted for use as a conveyer-transfer agency in any actuation in which the two conveyers are distantly and/or directionally disposed near the transfer point.

It is to be understood, of course, that the carriage and release device is not necessarily limited in its use to conveyers of the exact relation and types herein disclosed, but may be applied, with equal effect, to certain other lifting, lowering and conveying operations in which an article is to be released at a certain stage in its travel.

I claim as my invention:

1. In combination with a conveyer of overhead trolley type, a hook member carried by the trolley, adapted for lifting and transporting engagement with a transported article provided with a bail or eye member, a platform conveyer disposed adjacent to and below the path of the trolley conveyer for receiving an article transported thereby, the platform conveyer being movable across the plane of travel of the trolley conveyer, a U-shaped camming member pivotally carried by, and swingable rearwardly of the trolley conveyer and hook, and a spring tending to bias the free end of the camming member toward the free end of the hook for clearing the hook of the bail portion of said article as the load of the article is taken therefrom.

2. In a conveyer system, a conveyer of overhead trolley type, including a track having an inclined portion, a hook carried by a trolley of said conveyer and adapted to receive a bail structure of an article to be transported thereby, the hook having its opening presented rearwardly of its path of travel, a platform type conveyer movable across the course of, and subtending in spaced relation the inclined portion of the trolley conveyer, and so spacially related thereto that an article transported by the overhead conveyer may be transferred on to the said platform conveyer, and a spring pressed camming member carried by the said hook, and movable rearwardly of the hook and trolley conveyer to clear the hook of the transported article, when relieved of its weight upon reception of said article by the platform conveyer.

3. In combination in a conveyer of overhead trolley type, a roller carriage and a track for same, a hook depending from said carriage and flexibly connected thereto, said hook having a shank portion, a hook end, and a defined eye receiving seat at the point of convergence of said shank and hook end, a kick-off member consisting of a U-shaped member pivoted at one end to the upper shank portion of the hook, and adapted laterally to embrace such portion when in one extreme of its pivoted movement, the side portions of said U-shaped member laterally overlying the shank and hook end in any position of its pivotal movement whereby to prevent the entrance of a supporting link between the kick-off member and the shank of the hook, and a spring tending to bias the free end of the kick-off member toward the free end of the hook.

4. In combination with a conveyer of overhead trolley type, including a carriage and a track therefor, a hook depending from said carriage and swingably connected thereto, the hook having a shank portion and a hook end, a kick-off member consisting of a U-shaped element pivoted at one end to the upper shank portion of the hook, and adapted laterally to embrace such portion when in one extreme of its pivoted movement, the side portions of said U-shaped member laterally overlying the shank and hook and in any position of its pivotal movement, whereby to prevent the entrance of a supporting link between the kick-off member and the shank of the hook, and means tending to bias the free end of the kick-off member toward the free end of the hook.

WILLIAM C. HEATH.